(12) United States Patent
Orte Espejo

(10) Patent No.: US 11,725,169 B2
(45) Date of Patent: Aug. 15, 2023

(54) METHOD FOR PRODUCING SANGRIA AND RESULTING COMPOSITION

(71) Applicant: CIA DE VINOS DEL ATLANTICO, S.L., Madrid (ES)

(72) Inventor: Alberto Orte Espejo, Madrid (ES)

(73) Assignee: CIA DE VINOS DEL ATLANTICO, S.L., Madrid (ES)

( * ) Notice: Subject to any disclaimer, the term of this patent is extended or adjusted under 35 U.S.C. 154(b) by 14 days.

(21) Appl. No.: 16/619,836

(22) PCT Filed: Jun. 11, 2018

(86) PCT No.: PCT/ES2018/070418
§ 371 (c)(1),
(2) Date: Apr. 7, 2020

(87) PCT Pub. No.: WO2018/229316
PCT Pub. Date: Dec. 20, 2018

(65) Prior Publication Data
US 2020/0385658 A1    Dec. 10, 2020

(30) Foreign Application Priority Data

Jun. 12, 2017 (ES) ................................ ES201700628

(51) Int. Cl.
*C12G 3/06* (2006.01)
*C12G 3/04* (2019.01)

(52) U.S. Cl.
CPC ...................................... *C12G 3/06* (2013.01)

(58) Field of Classification Search
CPC ..................................... C12G 3/06; C12G 3/04

USPC .......................................................... 426/592
See application file for complete search history.

(56) References Cited

U.S. PATENT DOCUMENTS

| | | | | |
|---|---|---|---|---|
| 5,866,182 | A | * | 2/1999 | Exner ................... A01N 47/06 |
| | | | | 426/330.3 |
| 2010/0119667 | A1 | * | 5/2010 | Livaich ................... C12G 3/06 |
| | | | | 426/131 |

FOREIGN PATENT DOCUMENTS

| CN | 104814504 A | | 8/2015 | |
|---|---|---|---|---|
| DE | 26 44 683 | * | 10/1976 | ............... C12G 3/06 |
| DE | 2644683 A1 | | 4/1978 | |
| EP | 0181190 A2 | | 5/1986 | |
| ES | 1191833 U | | 9/2017 | |
| FR | 2887257 A1 | | 12/2006 | |
| FR | 2968311 A1 | | 6/2012 | |
| WO | 2010062548 A1 | | 6/2010 | |

(Continued)

OTHER PUBLICATIONS

Enjoyable Me, My edible adventures and Other Things, Kombuch Sangria, May 13, 2014 http://www.enjoyableme.com/2014/05/kombucha-sangria.html teaching sangria with Kombucha containing lactic acid (Year: 2014).*

(Continued)

*Primary Examiner* — Donald R Spamer
*Assistant Examiner* — Philip A Dubois
(74) *Attorney, Agent, or Firm* — Lucas & Mercanti, LLP

(57) ABSTRACT

The present invention discloses a method for producing a sangria on an industrial scale and the resulting composition, which has a characteristic that allows the homemade taste of a sangria to be maintained, and at the same time it can be stored without changes in its appearance.

1 Claim, 1 Drawing Sheet

(56) References Cited

FOREIGN PATENT DOCUMENTS

WO      2015151021   A1    10/2015

OTHER PUBLICATIONS

Sangria de Cava recipe, accessed at htttps://www.sangriasecrets.com/sangria-de-cava.html (Year: 2014).*
Muri Dhamadhikari, Use of Inert Gases, accessed at https://www.extension.iastate.edu/wine/wp-content/uploads/2021/09/useofinertgases1.pdf, 2021 (Muri).*
International Search Report for Corresponding International Application No. PCT/ES2018/070418 (2 Pages) (dated Nov. 5, 2018).

* cited by examiner

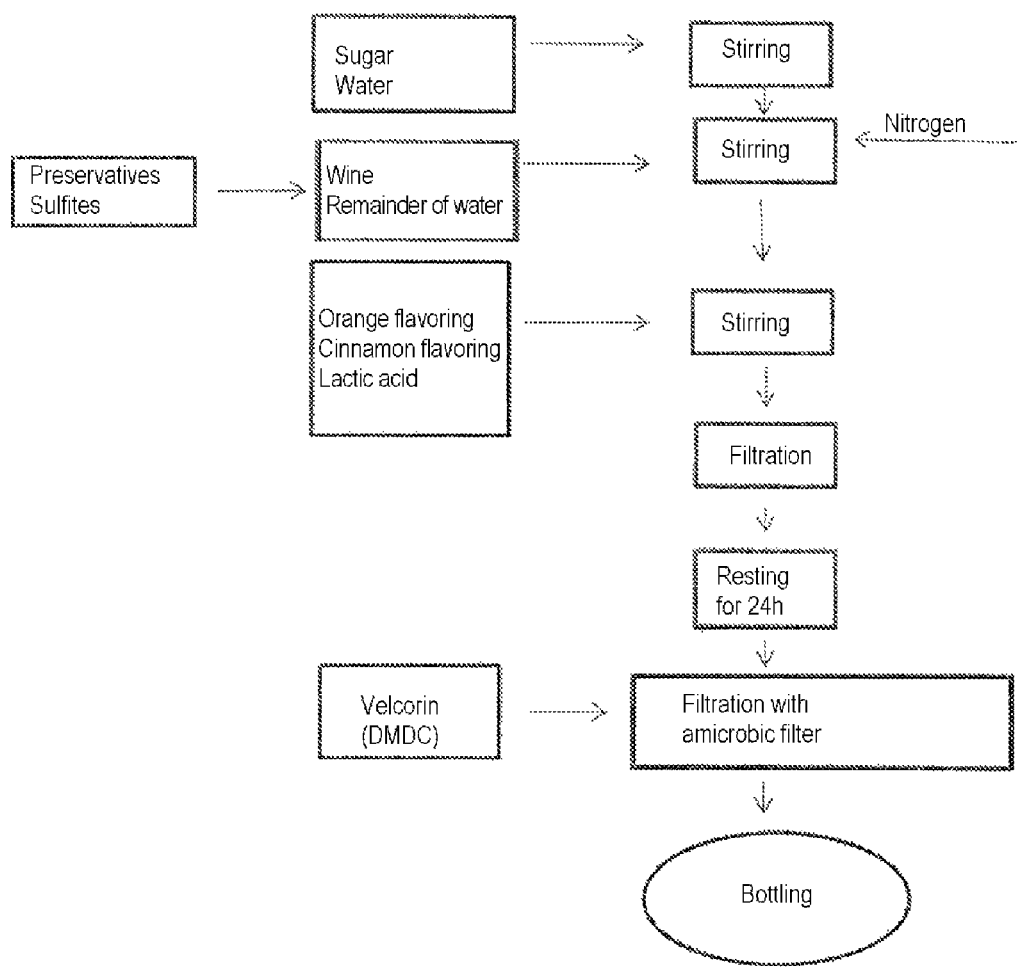

METHOD FOR PRODUCING SANGRIA AND RESULTING COMPOSITION

CROSS REFERENCE TO RELATED APPLICATION

This Application is a 371 of PCT/ES2018/070418 filed on Jun. 11, 2018 which, in turn, claimed the priority of Spanish Patent Application No. P201700628 filed on Jun. 12, 2017, both applications are incorporated herein by reference.

AIM OF THE INVENTION

The present invention discloses a method for producing a sangria on an industrial scale and the resulting composition, which has a characteristic that allows the homemade taste of a sangria to be maintained, and at the same time it can be stored without changes in its appearance.

BACKGROUND OF THE INVENTION

Sangria is one of the most consumed beverages, especially in the summer time, which is when its consumption shoots up. In fact, it is one of the drinks that characterizes us most in the eyes of many other regions of the world, since it has become world famous with the passage of time.

It is a drink based on very varied crushed fruit, such as orange, lemon, apple, peach, etc., mixed with red wine, sugar and some alcohol such as cava or cognac. All this makes this recipe one of the most refreshing drinks for combating the difficult hot times, especially in our region.

Sangria has its origin in The Antilles when they were British colonies. Its abundant appearance also dates from the large Spanish presence at the end of the 19th century in Paraguay and Argentina in the summer season.

In the middle of the 19th century, it was said, as we have already explained, that owing to the abundant consumption thereof in British colonies, its invention is attributed to them, as being strictly speaking an English drink.

The term Sangria comes from the Spanish word "sangre" (blood), a designation based on its red color. In many American colonies it was called "wine lemonade".

The basis of sangria is red wine, from where it gets the name sangria, which reflects the color of blood. It can also be made with white wine, in which case it is sometimes not called simply sangria, but white sangria. However, EU legislation stipulates that sangria made with white wine is called Clarea. The drink resulting from macerating fruit in white wine was known in old recipe books by the English word cup. In Catalonia it is often made with cava, in which case the word sangria may also be used: cava sangria. On the other hand, in Asturias, cider is commonly used instead of wine, and it is then called cider sangria.

Although in practice any wine may be used, a fruity young red wine is the most suitable. It does not matter that it has a high alcohol content, since it will be diluted with water. It should have a high content of tannins, since they too will be diluted. A young Toro wine of 14% by volume or more is very suitable.

The other important ingredient is sugar. It is advisable to add sugar in the form of sirup so that it mixes uniformly. It must not result in a sickly-sweet drink.

The fruits that are added regularly are lemon and orange. From lemon, only its juice is added in the desired amount, in contrast to the other fruits, which are cut up and put in, but their juice is not squeezed out. The same applies to the orange.

It is best to use seasonal fruits, which are always more aromatic. They must be fleshy fruits such as peach, apricot, pear, apple and banana. They must be cut up into pieces so that maceration is effective.

Spices are also added. It has to be borne in mind, however, that some people detest them. The same applies to other spices.

As the fruit has to macerate for a few hours to impart its taste, if it is desired for the sangria to contain carbon dioxide, it should be added at the last moment so that the gas does not disappear into the air. Carbonated soft drinks of orange or lemon are often used. They may be replaced with effervescent powders.

It is possible to add a dash of red vermouth, brandy, triple sec or other alcoholic beverages; this converts the sangria into a drink of high alcoholic strength, but with the sensation of drinking a drink with a lower alcohol content. According to EU law, as has been seen, such a drink is no longer sangria, but Zurra.

The present invention presents a method and composition for producing a sangria with all the characteristics of a homemade sangria without affecting the sensory characteristics of the wine, and without altering its taste, color and aroma. Using preservatives that make it possible to maintain the appearance and the typical color of this drink.

DESCRIPTION OF THE DRAWINGS

To supplement the description that is being presented and with the aim of assisting better understanding of the characteristic features of the invention, according to a preferred example of practical implementation thereof, a set of drawings is appended as an integral part of said description, showing the following, for purposes of illustration and in nonlimiting fashion:

FIG. 1 shows a schematic diagram of the method of preparation of the sangria of the present invention.

DESCRIPTION OF THE INVENTION

The present invention discloses a method for preparing sangria on an industrial scale with an ethanol content of approximately 6% and that is based on addition of the raw materials in a coordinated manner with stirring techniques by means of centrifugation, and filtration in the presence of a nitrogen atmosphere. The method includes filtration techniques such as cross-flow filtration and with an amicrobic filter of 0.45 microns, pumped by a dimethyl dicarbonate (DMDC) Velcorin pump.

With this method and composition, a sangria is obtained with all the characteristics of a homemade sangria without affecting the sensory characteristics of the wine, and without altering its taste, color and aroma.

PREFERRED EMBODIMENT OF THE INVENTION

The present invention describes a new composition of sangria for use on an industrial scale having all the characteristics and flavors of a homemade sangria but without using fruits directly, which avoids easy decomposition thereof, in addition to the qualities supplied by a refreshing drink with an ideal alcohol content and with a special taste.

The sangria composition of the present invention consists of wine, water, sugar, lactic acid, natural orange and cinnamon flavorings with a water-alcohol base and preservatives. These components are treated by a method having the following steps:

Water and sugar in a ratio of 500 kg to 500 kg are added to a 3000-kg tank consisting of a centrifugal pump and blades, when the mixture has dissolved completely it is passed through a stirred tank with injection of nitrogen, where the remainder of water and wine are introduced. The wine contains inorganic sulfites, which act as additives with antioxidant and preservative action, which prevent the oxidation of oils and fats and maintain the original color of the sangria (inhibition of enzymatic and nonenzymatic browning), and in addition prolong the useful life of the drink, especially in an acidic environment. In this step the resultant mixture is adjusted so that it has 6% alcohol. The spices are added, such as natural orange and cinnamon flavorings with a water-alcohol base and lactic acid, stirring for 2 hours, and once the mixture is homogeneous it is passed through a cross-flow filter and is left to stand for a time of less than 24 hours before being bottled. Prior to bottling it is passed through an amicrobic filter of 0.45 microns, the purpose of which is to retain microorganisms (bacteria and yeasts) so that they do not pass into the sangria, pumping by means of a Velcorin® pump consisting of dimethyl dicarbonate (DMDC), which is added with the purpose of ensuring microbiological stabilization prior to bottling and to ensure that the sugars do not undergo any fermentation. After completion of these steps it is bottled.

The sangria of the present invention has the following percentage composition
Ingredients:

| INGREDIENTS | % |
| --- | --- |
| Wine and water | 92.9754% |
| Natural sugar | 6.50% |
| Lactic acid | 0.37% |
| Orange flavoring | 0.13% |
| Cinnamon flavoring | 0.0046% |
| Preservative: sulfurous and DMDC | 0.020% |
| TOTAL | 100% |

With this method and composition, a sangria is obtained with all the characteristics of a homemade sangria without affecting the sensory characteristics of the wine, and without altering its taste, color and aroma. Another aspect to be taken into account is that sangria usually has various fruits, such as slices of citrus fruits, apple, etc., which complicates the establishment of sterilization, since some of the fruits might become too soft, even leading to complete degradation of the tissues, imparting the unpleasant appearance to the packaging, therefore in the method we use sulfides and Velcorin® that has an antioxidant and preservative action and these prevent the oxidation of oils and fats and maintain the original color of the sangria.

The invention claimed is:

1. A sangria obtained by a method for producing sangria comprising:
    a) adding water and sugar in a ratio of 500 kg to 500 kg to a 3000-kg tank consisting of a centrifugal pump and blades, stirring until dissolved to obtain a water and sugar solution;
    b) passing the water and sugar solution through a stirred tank with injection of nitrogen, into which additional water and wine are introduced to obtain a first mixture;
    c) adjusting the resultant first mixture from step b) so that the mixture has 6% alcohol thereby obtaining a second mixture;
    d) adding spices comprising cinnamon flavoring, orange flavoring and lactic acid to the second mixture and stirring for 2 hours thereby obtaining a third mixture;
    e) passing the third mixture from step d) through a cross-flow filter and leaving to stand for a time of less than 24 hours thereby obtaining a fourth mixture;
    f) passing the fourth mixture through an amicrobic filter of 0.45 microns, pumping by use a Velcorin pump consisting of dimethyl dicarbonate (DMDC) thereby obtaining the sangria, and
    g) bottling the sangria,
wherein the sangria consists of the following percentage composition:

| Wine, water and nitrogen | 92.9754% |
| --- | --- |
| Sugar | 6.50% |
| Lactic acid | 0.37% |
| Orange flavoring | 0.13% |
| Cinnamon flavoring | 0.0046% |
| Preservatives and dimethyl dicarbonate (DMDC). | 0.020% |

* * * * *